United States Patent [19]

Descals Munt

[11] 4,332,366

[45] Jun. 1, 1982

[54] ADJUSTABLE QUADRANGULAR BASE FOR FRAMEWORK ASSEMBLING MACHINES

[76] Inventor: Buenaventura Descals Munt, Estacion St. 6, Sallent (Barcelona), Spain

[21] Appl. No.: 136,626

[22] Filed: Apr. 2, 1980

[30] Foreign Application Priority Data

Apr. 2, 1979 [ES] Spain .................................... 479.998

[51] Int. Cl.³ .......................................... F16M 7/00
[52] U.S. Cl. ................... 248/670; 248/172; 403/52; 52/645; 269/111; 269/289 R
[58] Field of Search .................. 52/645, 646, 656; 248/172, 346, 466, 670; 403/52, 104, 105, 106; 269/41, 42, 45, 111, 289

[56] References Cited

U.S. PATENT DOCUMENTS

| | | | |
|---|---|---|---|
| 1,568,758 | 1/1926 | Malcolm | 248/172 X |
| 2,739,776 | 3/1956 | Terando | 248/172 X |
| 2,744,590 | 5/1956 | Butts | 52/645 |
| 3,066,962 | 12/1962 | Koehler | 269/111 X |
| 3,230,595 | 1/1966 | Kedem | 403/104 X |
| 3,521,341 | 7/1970 | Hörnlein et al. | 248/161 X |
| 4,033,539 | 7/1977 | Bardocz | 248/228 |

Primary Examiner—Roy D. Frazier
Assistant Examiner—Ramon O. Ramirez
Attorney, Agent, or Firm—Blanchard, Flynn, Thiel, Boutell & Tanis

[57] ABSTRACT

An adjustable quadrangular base, such as for a framework assembling machine, including a group of four elongated rigid elements each having a rigid boxlike member fixed to one end thereof. The boxlike members all have a substantially planar upper surface thereon, which surfaces are all coplanar. An opening extends through each boxlike member parallel to the respective upper surface and perpendicular to the respective elongated element. Each elongated element slidably extends through the opening formed in the boxlike member fixed to one of the remaining elements, whereby two of the elongated elements define a parallel pair which extends in perpendicular relationship to a parallel pair defined by the remaining two elements. The elements can be relatively slidably displaced with respect to the other elements due to the slidable engagement between each element and one of the boxlike members, whereby the size of the square defined by the upper surfaces of the four boxlike members can be enlarged or contracted.

2 Claims, 5 Drawing Figures

ADJUSTABLE QUADRANGULAR BASE FOR FRAMEWORK ASSEMBLING MACHINES

The present invention relates generally to improvements in the bases destined to constitute the lower part of assembling machines, characterised in that convenient dimensions can be graduated, to be adjusted to different sizes of the pieces to be mechanized, being this for instance the case in the construction of frames for metallic carpentry, i.e. light iron or wood working, frame members for constructions, machinery parts and alike.

The base as foreseen in the improvements of this invention allows composing a quadrangular shaped support of any size comprised between certain limits on which is constituted a working or operating table of suitable dimensions as to the piece to be processed. Therefore, as to the length and the width of each of the structures to be assembled, the planes corresponding to the vertexes of the table, defined on the described base, are brought closer together or are further separated, in such way that the vertexes of the structures remain always duly supported and in its case retained by the tables and tool equipment solidly connected to the same. Consequently the squaring, clamping, perforating, cutting or milling of the elements forming the structures or frames is carried out under the best precision conditions for obtaining most advantageous results, quick operation and operator's comfort.

An improved adjustable base which is the subject of this invention consists in a square defined by four double T flanged elongated profile elements, each one relating by one of its extremes with the other elements by means of a sliding box which slidably accommodates the element which is perpendicular with respect to the element in question, so that by sliding the different boxes one obtains the extension or contraction of the defined square until this last one acquires the desired length and width.

The displacement of the boxes is carried out by means of roller bearing sets supported on the sides and flanks of the flanges of the elements, resulting in a very smooth movement and a big degree of accuracy or reliability concerning displacement. This is easily obtained by manual pushing of the boxes interrupting the blocking of these by means of studs or bolts fixing them into the desired position.

The above brief description, features and advantages of the present invention will be more fully appreciated by reference to the following detailed description of a presently preferred, but nonetheless illustrative embodiment concerning the improvements in the quadrangular adjustable bases for assembling machines of frames and when taken in conjunction with the accompanying drawings wherein.

The elongated metallic elements 1 and 1' are preferably structural or rolled steel in the form of an I or a double T cross section. These elements have the top and bottom sides 2 of their flanges 3 formed as planar surfaces obtained by form finishing.

Figure 1:
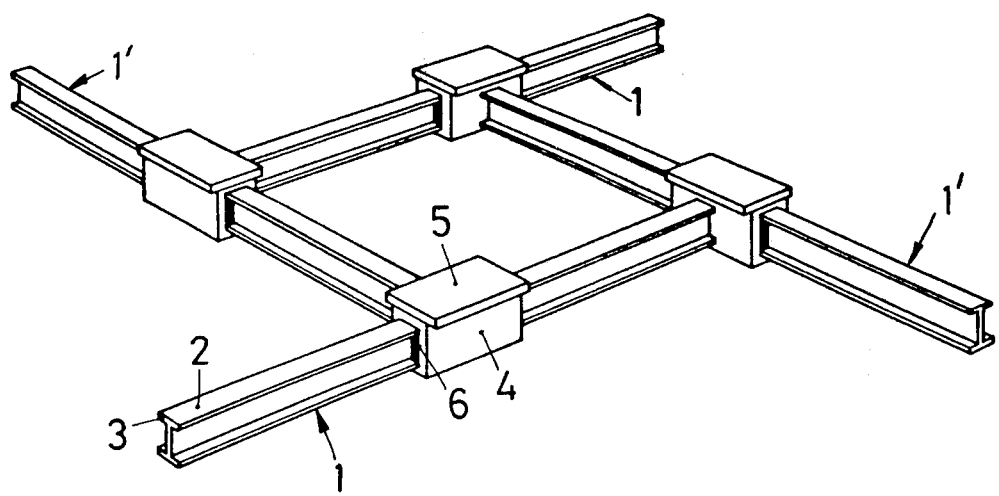
FIG. 1 is a perspective view of the new adjustable base.
Figure 3:
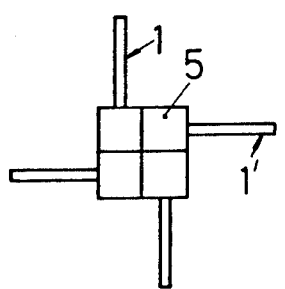
FIGS. 3 through 5 illustrates other positions of the slidable boxes corresponding respectively to a square of a minimum size, to a rectangle of intermediate dimensions and to a square of maximum size, obtained with the improved base in question.
Figure 4:
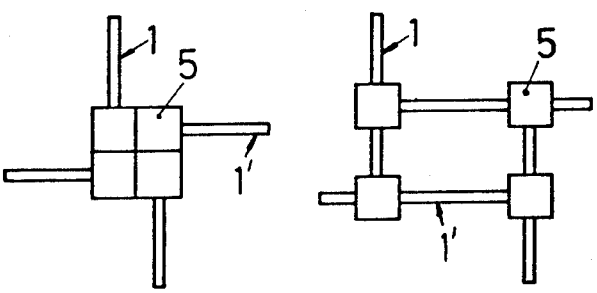
Figure 5:
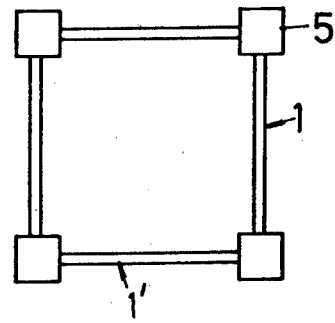
Figure 2:
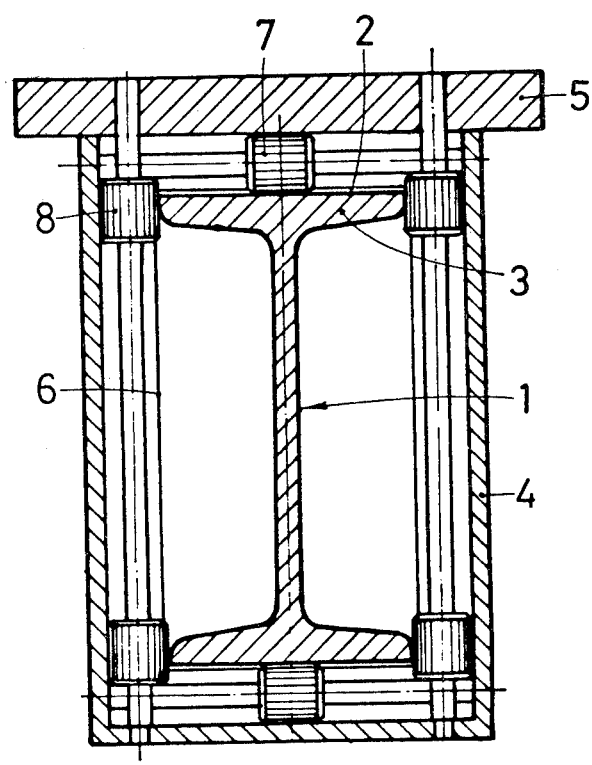
FIG. 2 is a transversal section of the same in the part corresponding to a slidable box along and exteriorly to one of the profile elements forming a runway.

The metallic boxes 4 show in the upper parts some plates 5 which define surfaces that are coplanar in such way that when the base is contracted as in FIG. 3 they define a perfect planar square.

An opening 6 extends through each box 4 in perpendicular relationship to the elongated direction of the respective element 1. The opening 6 accommodates therein the cross-sectional profile of another one of the elements 1.

The rollers 7 are situated within the boxes 4 with their transverse axes in the inner side of the boxes 4, which roller elements engage the top and bottom sides 2 of element T to assure the vertical guiding of the same. The vertical rollers 8 are disposed between the lateral sides of the box and the edges of the flanges of the element 1, assuring the horizontal guiding of same.

The element 1' is perpendicular to 1, thus defining one of the sides of the square of variable size defined by the described base.

The displacement of the boxes 4 along the elements 1 and 1' is carried out as to the improvements of this invention by means of a simple manual pushing, taking into account the smoothness of the movement obtained with the rollers 7 and 8 in the interior of the boxes. The locking of these into a suitable position once the square has acquired the desired dimensions, can be carried out by means of a stud (not shown) threaded into an orifice existing on the outer lateral side of each box 4, tightened against the side of the related element.

There can be appreciated a great variety of uses of the improved adjustable bases as described, being for instance one the constitution of a machine for building frames for carpentry for which purpose each one of the boxes 4 shows on the upper plate 5 a column sustaining a table which in conjunction with the one of the other boxes defines an upper plane of work. Preferably on the table there are disposed some tools and fastening devices which retain the components of the frame during the shaping phase, concretely referring to the union to the mitered joint of the extremes of said parts which remain perfectly supported on their ends, allowing thus to construct the referred unions with great precision, rapidity and comfort.

What we claim is:

1. Improvements in an adjustable quadrangular base, such as for a framework assembling machine, comprising a group of four rigid elongated elements each having finished planar surfaces on the upper and lateral sides thereof, a rigid box-like member fixed to one end of each said elongated element, each said box-like member having an upper plate which defines thereon an upper surface which is coplanar with the upper surfaces defined on each other said box-like member, each said boxlike member having an opening extending therethrough in a direction which is parallel with said upper surface and perpendicular to the elongated direction of said element to which said box-like member is fixed, each said box-like member rotatably supporting thereon a plurality of cylindrical rollers including a pair of horizontally disposed rollers positioned adjacent the upper and lower sides of the opening for rollingly supportingly engaging the upper and lower sides of a said elongated element, said plurality of cylindrical rollers also including a pair of vertically disposed rollers positioned adjacent the opposite sides of the opening for rollingly supportingly engaging the opposite lateral sides of said latter elongated element, each said elongated element being rollingly and longitudinally movably supported within and projecting through a said box-like member which is fixed to a remaining one of the elongated elements so that there is defined a quadrangular arrangement whereby two said elongated elements define a first parallel pair which extends perpendicular to a second parallel pair as defined by the remaining two elongated elements, whereby the elongated elements can be movably longitudinally displaced through the box-like members to vary the size and shape of the rectangular arrangement defined by the upper surfaces of the four box-like members.

2. Improvements according to claim 1, wherein each elongated element has an I-shaped cross section when viewed vertically, and wherein each box-like member supports thereon two vertically spaced pairs of vertical rollers disposed for rollingly engaging the opposite side edges of the upper and lower flanges defined on each I-shaped elongated element.

* * * * *